(12) United States Patent
Kibe et al.

(10) Patent No.: US 9,261,740 B2
(45) Date of Patent: Feb. 16, 2016

(54) LIQUID CRYSTAL PANEL

(71) Applicants: JNC CORPORATION, Tokyo (JP);
JNC PETROCHEMICAL CORPORATION, Tokyo (JP)

(72) Inventors: Shigeru Kibe, Chiba (JP); Toshiki Asakura, Chiba (JP); Yasuhiro Kubo, Chiba (JP)

(73) Assignees: JNC CORPORATION, Tokyo (JP);
JNC PETROCHEMICAL CORPORATION, Tokyo (JP)

( * ) Notice: Subject to any disclaimer, the term of this patent is extended or adjusted under 35 U.S.C. 154(b) by 116 days.

(21) Appl. No.: 14/203,565

(22) Filed: Mar. 11, 2014

(65) Prior Publication Data
US 2014/0313461 A1    Oct. 23, 2014

(30) Foreign Application Priority Data
Apr. 23, 2013  (JP) ................................. 2013-090324

(51) Int. Cl.
| | | |
|---|---|---|
| G02F 1/1337 | (2006.01) | |
| G02F 1/1343 | (2006.01) | |
| G02F 1/137 | (2006.01) | |
| G02F 1/1335 | (2006.01) | |
| C09K 19/34 | (2006.01) | |
| C09K 19/30 | (2006.01) | |

(52) U.S. Cl.
CPC ............ *G02F 1/13439* (2013.01); *G02F 1/137* (2013.01); *G02F 1/133707* (2013.01); *G02F 1/134309* (2013.01); *C09K 2019/3027* (2013.01); *C09K 2019/3422* (2013.01);
(Continued)

(58) Field of Classification Search
CPC .................... G02F 1/133512; G02F 1/133703;
G02F 1/134336; G02F 1/124309; G02F 1/13439; G02F 1/13706; G02F 1/13712; G02F 2201/123; G02F 2201/1343; G02F 2201/137; G02F 1/133707; G02F 1/133514; G02F 1/134309; G02F 1/137; G02F 2201/13706; G02F 2201/13712; G02F 2201/134372; G02F 2201/134345; G02F 2201/136222; G02F 2202/40; C09K 19/02; C09K 19/0403; C09K 19/0414; C09K 19/3402; C09K 19/3422; C09K 19/3425; C09K 2019/3027
See application file for complete search history.

(56) References Cited

U.S. PATENT DOCUMENTS 7,102,714 B2 *   9/2006   Tsuchiya .......... G02F 1/133555
                                                    349/113
8,582,060 B2 *  11/2013   Ota ................... G02F 1/133512
                                                    349/110

(Continued)

FOREIGN PATENT DOCUMENTS

JP    2002-221726    8/2002
JP    2012-113332    6/2012

*Primary Examiner* — Shean C Wu
(74) *Attorney, Agent, or Firm* — Jianq Chyun IP Office

(57) ABSTRACT

To allow drive at low voltage and obtaining high transmittance in liquid crystal panel driven by FFS mode. Liquid crystal panel 10 has first substrate 14 and second substrate 27 oppositely arranged, and liquid crystal layer LC interposed between the first and the second substrates, wherein the first substrate has plural signal lines 18 and scanning lines 15 formed in matrix in mutually insulated state, upper electrode 24 having plural slit-shaped openings 25 divided by the scanning lines and signal lines, and formed for every sub-pixel, and lower electrode 21 formed with the upper electrode through insulating layer 23, the second substrate has light-shielding layer 28 superimposed with the signal lines and scanning lines in planar view, and color filter layer 29 formed for every sub-pixel, and the liquid crystal layer has at least one compound having negative dielectric anisotropy and at least one compound having positive dielectric anisotropy mixed.

7 Claims, 4 Drawing Sheets

(52) U.S. Cl.
CPC ... *C09K2019/3425* (2013.01); *G02F 1/133512* (2013.01); *G02F 1/133514* (2013.01); *G02F 2001/13706* (2013.01); *G02F 2001/13712* (2013.01); *G02F 2001/134372* (2013.01); *G02F 2201/123* (2013.01); *G02F 2202/40* (2013.01)

(56) References Cited

U.S. PATENT DOCUMENTS

| | | | | |
|---|---|---|---|---|
| 8,629,962 B2 * | 1/2014 | Ota | ................... | G02F 1/133707 349/109 |
| 9,041,884 B2 * | 5/2015 | Ota | ................... | G02F 1/133512 349/110 |
| 2002/0067448 A1 | 6/2002 | Kim et al. | | |
| 2006/0256266 A1 * | 11/2006 | Tsuchiya | .......... | G02F 1/133555 349/114 |
| 2007/0132927 A1 * | 6/2007 | Tsuchiya | .......... | G02F 1/133707 349/117 |
| 2012/0008073 A1 * | 1/2012 | Ota | ................... | G02F 1/134336 349/106 |
| 2013/0155357 A1 * | 6/2013 | Ota | ................... | G02F 1/133512 349/110 |
| 2014/0313462 A1 * | 10/2014 | Kibe | ................. | G02F 1/134309 349/106 |

* cited by examiner

During no voltage application    During voltage application

LIQUID CRYSTAL PANEL

CROSS-REFERENCE TO RELATED APPLICATIONS

This application claims the priority benefit of Japan application serial no. 2013-090324, filed on Apr. 23, 2013. The entirety of the above-mentioned patent application is hereby incorporated by reference herein and made a part of this specification.

BACKGROUND OF THE INVENTION

1. Technical Field

The invention relates to a liquid crystal panel, particularly, to a liquid crystal panel suitable for a driving system according to a fringe field switching (FFS) mode.

2. Background Art

A liquid crystal panel has features of lighter weight, a flat-panel and lower electric power consumption in comparison with a cathode ray tube (CRT), and therefore is used for many electronics as a display use.

According to the liquid crystal panel, orientation of liquid crystal molecules aligned in a predetermined direction is changed by an electric field to change an amount of light transmitted through a liquid crystal layer, thereby displaying an image.

The liquid crystal panel includes a reflective type in which outside light enters the liquid crystal layer to be reflected on a reflector, and reflected light re-transmits the liquid crystal layer and is emitted, a transmissive type in which incident light from a backlight apparatus transmits the liquid crystal layer, and a transflective type having both properties.

Moreover, specific methods for applying the electric field to the liquid crystal layer of the liquid crystal panel include a longitudinal electric field system and a transverse electric field system.

In the liquid crystal panel according to the longitudinal electric field system, an electric field substantially in a longitudinal direction is applied to liquid crystal molecules by means of a pair of electrodes arranged by interposing the liquid crystal layer. As the liquid crystal panel according to the longitudinal electric field system, a liquid crystal panel having a mode such as a twisted nematic (TN) mode, a vertical alignment (VA) mode and a multi-domain vertical alignment (MVA) mode is known.

In the liquid crystal panel according to the transverse electric field system, a pair of electrodes is mutually insulated and arranged on an inner surface side of one of substrates of a pair of substrates arranged by interposing the liquid crystal layer, and an electric field substantially in a transverse direction is applied to the liquid crystal molecules. As the liquid crystal panel according to the transverse electric field system, a liquid crystal panel having an in-plane switching (IPS) mode in which a pair of electrodes does not overlap in a planar view, and a fringe field switching (FFS) mode in which a pair of electrodes overlaps in the planar view are known.

The liquid crystal panel according to the transverse electric field system allows obtaining of a wide viewing angle, and therefore has been increasingly used in recent years.

So far, according to a liquid crystal display apparatus having upper and lower substrates to be driven by the FFS mode, in a pixel electrode and a counter electrode being a pair of electrodes arranged in one substrate, even when off-state voltage corresponding to 0 V is applied to a certain pixel, other pixels are turned on, and therefore a specific signal is continuously applied to a data bus line.

Accordingly, a noise field is formed between the data bus line and the pixel electrode or between the data bus line and the counter electrode, thereby liquid crystal molecule isolating from a polarization axis to cause light leakage in the part.

In order to block the leaked light, patterning of a black matrix in a large region is performed to the other substrate, which requires patterning and also induces a decrease of an opening ratio in the liquid crystal panel, and thus a problem resulting in reduction of brightness has been caused.

In order to solve such a problem, Patent literature No. 1 below discloses an art in which, in a liquid crystal display apparatus driven by an IPS mode or an FFS mode being a normally black mode, a rubbing direction of a liquid crystal having a positive dielectric anisotropy ($\Delta\in$) is adjusted to coincide with a direction of a noise field, resulting in allowing a major axis of liquid crystal molecules to precisely coincide with the direction of the noise field, and thus even if the noise field acts, the liquid crystal molecules are not isolated from the polarization axis of a polarizer, and a dark state is designed to be maintained at any time.

Moreover, Patent literature No. 2 below discloses an art in which, in a transflective liquid crystal display apparatus such as an FFS mode liquid crystal display apparatus, a reflection display unit and a transmission display unit are adjusted in twist alignment and homogeneous alignment during no voltage application, and thus a less colored black display having high contrast is designed to be secured.

CITATION LIST

Patent Literature

Patent literature No. 1: JP 2002-221726 A.
Patent literature No. 2: JP 2012-113332 A.

SUMMARY OF INVENTION

A liquid crystal panel according to an embodiment of the invention concerns a liquid crystal panel having a first substrate and a second substrate that are oppositely arranged, and a liquid crystal layer interposed between the first substrate and the second substrate, wherein the first substrate has a plurality of signal lines and scanning lines formed in a matrix, an upper electrode having a plurality of slit-shaped openings and cross-sectional curve-shaped protruded electrodes alternately formed for every sub-pixel divided by the scanning lines and the signal lines, and a lower electrode formed with the upper electrode through an insulating layer, and the second substrate has a light-shielding layer superimposed with the signal lines and the scanning lines in a planar view, and a color filter layer formed for every sub-pixel described above.

DESCRIPTION OF EMBODIMENTS

Technical Problem

However, a pixel electrode (upper electrode) of a liquid crystal display apparatus according to Patent literature No. 1 described above is in a flat plate form, and has a problem of increased driving voltage.

Figure 7:
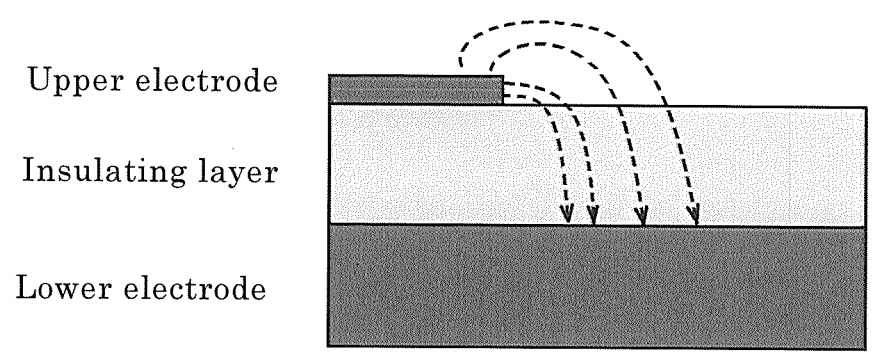
FIG. 7 shows a conceptual diagram of an electric line of force when a cross-sectional shape of an upper electrode is quadrangular (in a flat plate form) according to a conventional art.

When the problem is explained based on FIG. 7 showing a conceptual diagram of an electric line of force between an upper electrode and a lower electrode according to an FFS mode, an electric line of force extended from an upper surface of the upper electrode to the lower electrode becomes non-uniform by small height of the side surface of the upper electrode, and existence of a corner of the upper surface with the side surface of the upper electrode. Therefore, application of somewhat high driving voltage is required in order to obtain a uniform electric line of force, and a dark line is also generated, and thus hindrance of improvement in a transmittance has been caused.

Moreover, with regard to a transflective liquid crystal display apparatus according to Patent literature No. 2 described above, while a less colored black display can be secured, optimization is only made to a reflection display portion, and a pixel electrode (upper electrode) is in a flat plate form, in a manner similar to the art in Patent literature No. 1 described above, the apparatus has had a problem of increased driving voltage, and also a problem of no achievement of an improvement in a transmittance.

The invention has been made in order to solve the problem, and an object is to allow driving at a low voltage and obtaining of a high transmittance in a liquid crystal panel according to a driving system of the FFS mode.

Solution to Problem

Item 1. A liquid crystal panel according to an embodiment of the invention concerns a liquid crystal panel having a first substrate and a second substrate that are oppositely arranged, and a liquid crystal layer interposed between the first substrate and the second substrate, wherein the first substrate has a plurality of signal lines and scanning lines formed in a matrix, an upper electrode having a plurality of slit-shaped openings and cross-sectional curve-shaped protruded electrodes alternately formed for every sub-pixel divided by the scanning lines and the signal lines, and a lower electrode formed with the upper electrode through an insulating layer, and the second substrate has a light-shielding layer superimposed with the signal lines and the scanning lines in a planar view, and a color filter layer formed for every sub-pixel described above.

Item 2. The liquid crystal panel according to an embodiment of the invention concerns the liquid crystal panel according to item 1, wherein the upper electrode and the lower electrode overlap with each other in a planar view.

Item 3. The liquid crystal panel according to an embodiment of the invention concerns the liquid crystal panel according to item 1 or 2, wherein the protruded electrode has a semicircle shape, an elliptic shape or a trapezoidal shape.

Item 4. The liquid crystal panel according to an embodiment of the invention concerns the liquid crystal panel according to any one of items 1 to 3, wherein the protruded electrode is formed of an organic substance.

Item 5. The liquid crystal panel according to an embodiment of the invention concerns the liquid crystal panel according to anyone of items 1 to 4, wherein the liquid crystal layer is formed of a mixture of at least one compound having a negative dielectric anisotropy and at least one compound having a positive dielectric anisotropy.

Item 6. The liquid crystal panel according to an embodiment of the invention concerns the liquid crystal panel according to item 5, wherein the compound having the negative dielectric anisotropy has a structure represented by formula (a), and a dielectric anisotropy in a range of −10 or more and −2 or less, and the compound having the positive dielectric anisotropy has a dielectric anisotropy in a range of 2 or more and 30 or less.

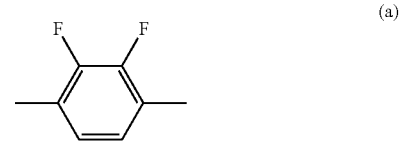

(a)

Item 7. The liquid crystal panel according to an embodiment of the invention concerns the liquid crystal panel according to item 6, wherein the compound having the positive dielectric anisotropy is further formed of a mixture with a compound having structure represented by formula (b).

(b)

Advantageous Effects of Invention

According to the invention, in a liquid crystal panel according to a driving system of an FFS mode, the panel can be driven at a low voltage, and simultaneously a high transmittance can be obtained.

Hereinafter, an embodiment of a liquid crystal panel according to the invention is described with reference to a drawing.

Constitution of a Liquid Crystal Panel

Figure 2:
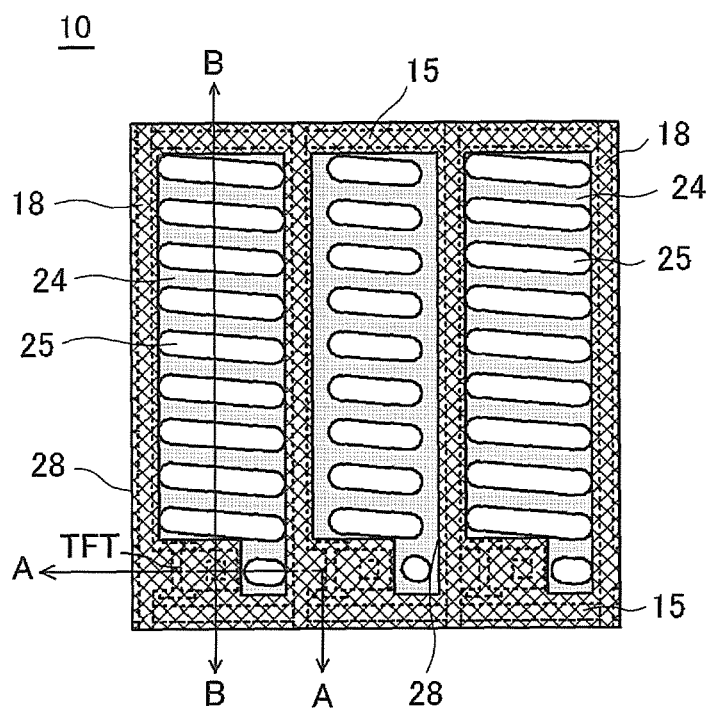
FIG. 2 shows a plan view of a liquid crystal panel according to an embodiment of the invention.
Figure 3:
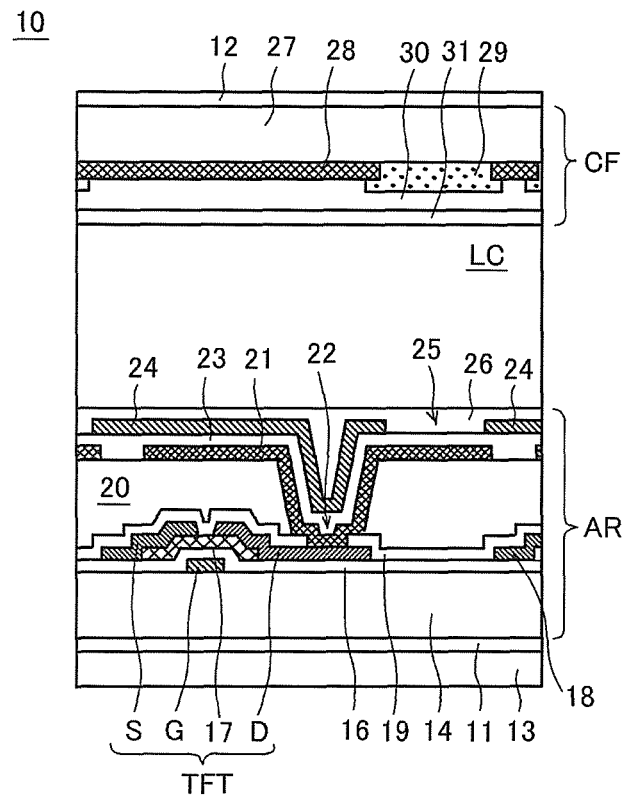
FIG. 3 shows an A-A cross-sectional view of a liquid crystal panel in FIG. 2 according to an embodiment of the invention.
Figure 4:
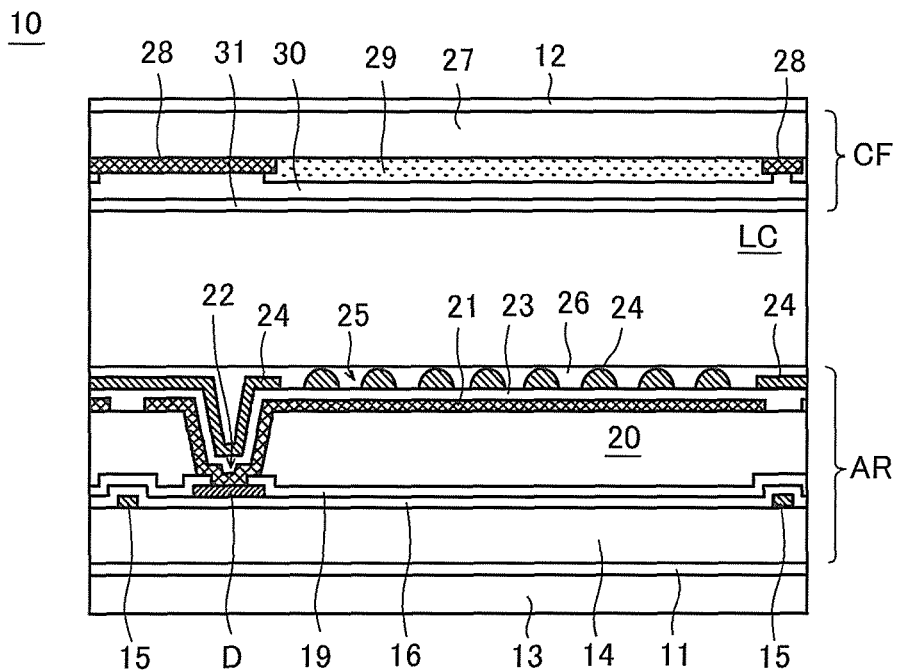
FIG. 4 shows a B-B cross-sectional view of a liquid crystal panel in FIG. 2 according to an embodiment of the invention.

FIG. 2 shows a plan view of a liquid crystal panel according to an embodiment of the invention, FIG. 3 shows an A-A cross-sectional view of the liquid crystal panel in FIG. 2, and FIG. 4 shows a B-B cross-sectional view of the liquid crystal panel in a similar manner.

Liquid crystal panel 10 of the present embodiment is driven by an FFS mode according to a transverse electric field system.

An essential part of liquid crystal panel 10 is explained using FIG. 2 to FIG. 4.

Liquid crystal panel 10 has a constitution in which liquid crystal layer LC is interposed between array substrate AR and color filter substrate CF.

Array substrate AR is formed of transparent insulating glass, quartz, plastic or the like, and has first transparent substrate 14 as a base substance.

On first transparent substrate 14, scanning line 15 formed of a metal such as aluminum and molybdenum is formed on a side facing with liquid crystal LC.

Moreover, transparent gate insulating film 16 formed of silicon nitride, silicon oxide or the like is laminated so as to cover scanning line 15 and gate electrode G. Then, on gate insulating film 16 overlapping with gate electrode G in a planar view, semiconductor layer 17 formed of amorphous silicon, polycrystalline silicon or the like is formed. On gate insulating film 16, a plurality of signal lines 18 formed of a metal such as aluminum and molybdenum are formed.

Furthermore, signal line 18 and drain electrode D simultaneously formed with a material identical with the material of source electrode S are arranged on gate insulating film 16, and drain electrode D is closely arranged with source electrode S, and partially brought in contact with semiconductor layer 17.

Thin film transistor TFT that serves as a switching device is constituted by gate electrode G, gate insulating film 16, semiconductor layer 17, source electrode S and drain electrode D.

Moreover, transparent passivation film 19 formed of silicon nitride, silicon oxide or the like is laminated so as to cover an exposed part of signal line 18, TFT and gate insulating film 16.

Then, flattened resin layer 20 formed of a transparent resin material such as a photoresist is laminated so as to cover passivation film 19.

Lower electrode 21 formed of a transparent conductive material such as indium tin oxide (ITO) or indium zinc oxide (IZO) is formed so as to cover flattened resin layer 20.

Moreover, contact hall 22 reaching drain electrode D through flattened resin layer 20 and passivation film 19 is formed, and lower electrode 21 and drain electrode D are electrically connected through the contact hall 22. Therefore, lower electrode 21 operates as a pixel electrode herein.

Transparent inter-electrode insulating film 23 formed of silicon nitride, silicon oxide or the like is laminated so as to cover lower electrode 21.

Then, upper electrode 24 formed of a transparent conductive material such as ITO and IZO is formed so as to cover inter-electrode insulating film 23.

On each sub-pixel divided by scanning line 15 and signal line 18, upper electrode 24 is integrally formed and operates as a common electrode.

As shown in FIG. 2 to FIG. 4, a plurality of slit-shaped openings 25 are formed on upper electrode 24. Slit-shaped openings 25 are oval, and inclined in a longitudinal direction, for example, by five degrees downward to the right relative to an extending direction of scanning line 15.

Alignment film 26 formed of polyimide is laminated by covering upper electrode 24.

Liquid crystal direction alignment treatment (rubbing treatment) is applied to alignment film 26 in parallel to an extending direction of signal line 18, and alignment of liquid crystal molecules in liquid crystal layer LC changes by an electric field between upper electrode 24 and lower electrode 21 in a position corresponding to slit-shaped opening 25.

Color filter substrate CF has, as a base substance, second transparent substrate 27 formed of transparent insulating glass, quartz, plastic or the like.

On second transparent substrate 27, as shown in FIG. 3 and FIG. 4, light-shielding layer 28 and color filter layer 29 through which light (R, G, B, for example) having a color different for every sub-pixel transmits are formed.

Overcoat layer 30 formed of a transparent resin material such as a photoresist is laminated so as to cover light-shielding layer 28 and color filter layer 29.

Overcoat layer 30 is arranged in order to flatten a level difference by color filter layer 29 having a different color, and simultaneously to allow no entry of an impurity flowing out from light-shielding layer 28 or color filter layer 29 into liquid crystal layer LC.

Alignment film 31 formed of polyimide or the like is formed so as to cover overcoat layer 30, and liquid crystal direction alignment treatment in a direction reverse to the direction of liquid crystal of alignment film 26 is applied to alignment film 31.

The thus formed array substrate AR and color filter substrate CF are opposed with each other, a sealing material (not shown) is arranged in a circumference of both substrates to bond both substrates, and a liquid crystal is filled between both substrates.

In addition, a spacer (not shown) for holding liquid crystal layer LC at predetermined thickness is formed on color filter substrate CF.

First polarizer 11 is arranged in an outside of array substrate AR, and second polarizer 12 is arranged in an outside of color filter substrate CF, respectively.

In the constitution described above, when TFT is turned into an ON state and voltage is applied between lower electrode 21 and upper electrode 24, an electric field is generated between both electrodes 21 and 24, and alignment of liquid crystal molecules in liquid crystal layer LC changes.

Thus, a light transmittance of liquid crystal layer LC changes to allow displaying of an image. Then, auxiliary capacity is formed by lower electrode 21, upper electrode 24 and inter-electrode insulating film 23, and when TFT is turned into OFF, the electric field between both electrodes 21 and 24 is held for a predetermined period of time.

Figure 1:
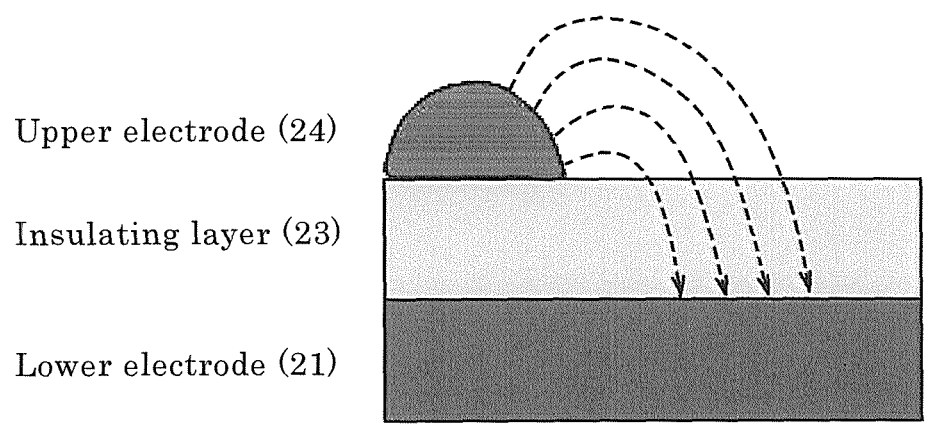
FIG. 1 shows a conceptual diagram of an electric line of force when a cross-sectional shape of a protruded electrode according to an embodiment of the invention is semicircular.

FIG. 1 shows lower electrode 21, round cross-sectional upper electrode 24, and inter-electrode insulating film 23 arranged between both electrodes.

Here, when voltage is applied between lower electrode 21 and upper electrode 24, as shown in the conceptual diagram of the electric line of force between the electrodes of the liquid crystal panel according to the FFS mode in FIG. 1, which is different from the conventional art in FIG. 7, a cross-sectional semicircle-shaped protruded electrode is formed on an upper electrode according to the invention. Therefore, a lateral (transverse) electric field is easily generated in the vicinity of an electrode interface, and a uniform electric line of force can be obtained, and further generation of a dark line is suppressed, and thus a transmittance can be improved.

Figure 5:
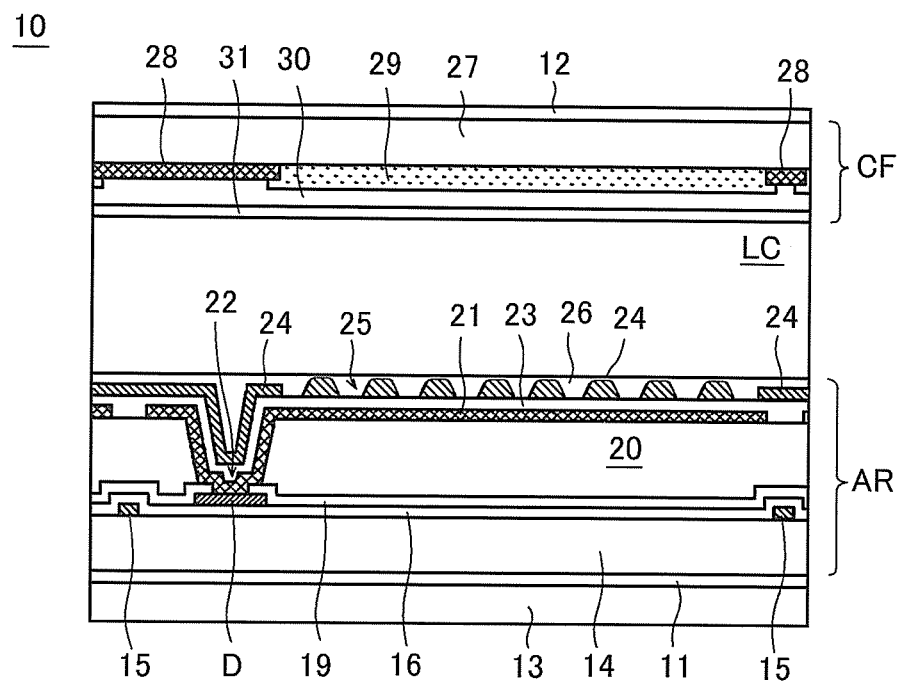
FIG. 5 shows a B-B cross-sectional view of a liquid crystal panel in FIG. 2 according to a modified example of an embodiment of the invention.

In addition, FIG. 5 shows a B-B cross-sectional view of a liquid crystal panel in FIG. 2 according to a modified example of the present embodiment, and is similar to the present embodiment except that a cross-sectional curve shape of the upper electrode is formed into a trapezoidal form.

Liquid Crystal Material

As a liquid crystal material used for the present embodiment, various kinds of conventionally known liquid crystal compounds are applied. In particular, in a case where a mixture of at least one compound having a negative dielectric anisotropy and at least one compound having a positive dielectric anisotropy is applied, such a case is preferred in view of allowing optically uniform self-compensation, and minimizing of a color difference during a white display, and further securing of a high transmittance. The compound having the negative anisotropy and the compound having the positive dielectric anisotropy are formed of at least one compound, respectively, and preferably, a mixture of at least two compounds.

Figure 6:
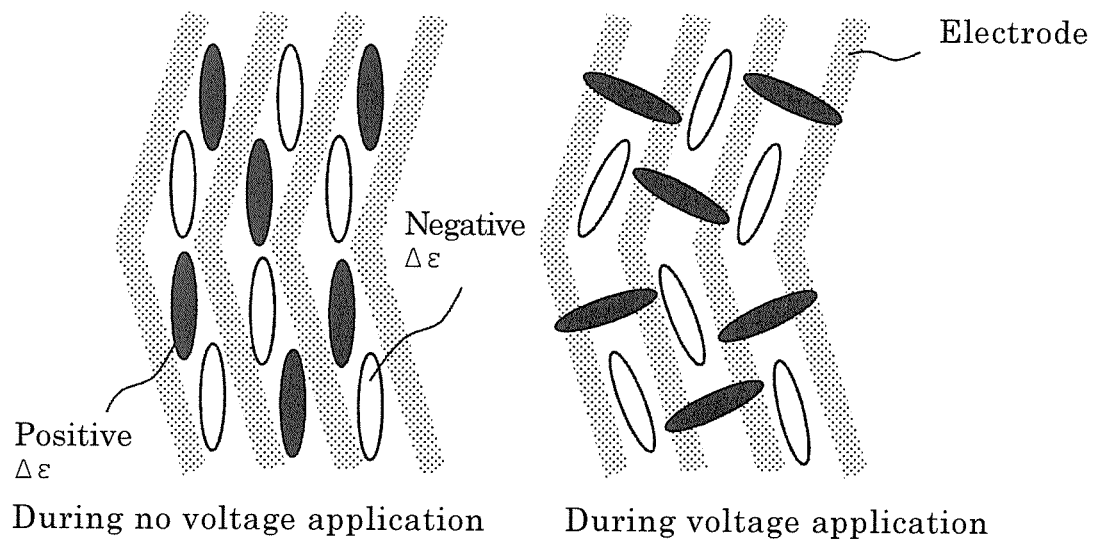
FIG. 6 shows a conceptual diagram of molecular arrangement of a liquid crystal layer formed of a mixture of a compound having a negative dielectric anisotropy (Δ∈) and a compound having a positive dielectric anisotropy (Δ∈).

More specifically, as shown in FIG. 6, when no voltage is applied, a liquid crystal component is arranged substantially in parallel to an electrode, and when voltage is applied, the compound having the positive dielectric anisotropy (LE) (shown by black) changes in a direction substantially perpendicular to the direction of the electrode, and the compound having the negative compound dielectric anisotropy (Δ∈) (shown by an outline) changes in a direction substantially parallel to the direction of the electrode.

On the occasion, the compound having the negative compound dielectric anisotropy (Δ∈) and the compound having the positive dielectric anisotropy (Δ∈) become substantially perpendicular and are not spatially divided bordering on a refraction region of the electrode, and the compound having the negative compound dielectric anisotropy (Δ∈) and the compound having the positive dielectric anisotropy (Δ∈) are mixed in any part, and uniform optical compensation is performed as a whole.

In the present embodiment, an embodiment is explained in which at least one compound having the negative dielectric anisotropy and at least one compound having the positive dielectric anisotropy are used.

General examples of the compound having the negative dielectric anisotropy include compounds as represented by compounds (1) to (5) below, and dielectric anisotropy of each compound is approximately −10 or more and approximately −2 or less, and preferably, approximately −7 or more and approximately −3 or less.

A ratio of mixing a crystal component having a negative dielectric anisotropy is preferably approximately 5% by weight or more for developing self-optical compensation, and preferably approximately 60% by weight or less for suppress a rise of driving voltage, and further preferably, approximately 10% by weight or more and approximately 50% by weight or less.

In the liquid crystal panel according to the FFS mode, when a compound is used for a liquid crystal layer formed of the mixture of the compound having the negative dielectric anisotropy (Δ∈) and the compound having the positive dielectric anisotropy to allow optically uniform self-compensation, an absolute value of Δ∈ is preferably moderately larger.

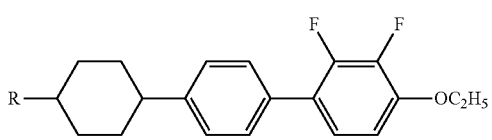
(1)

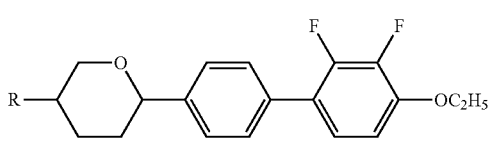
(2)

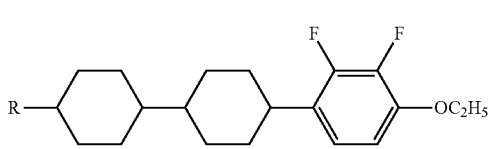
(3)

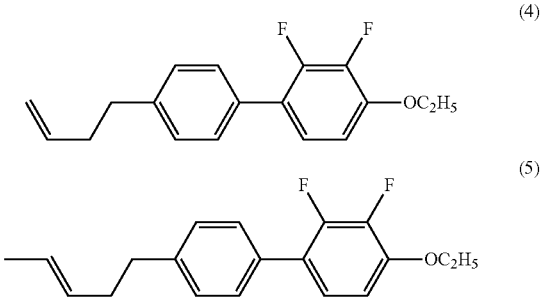
(4)

(5)

wherein, R is an alkyl group having 2 to 7 carbons or an alkenyl group having 2 to 7 carbons.

Moreover, compounds represented in (6) to (13) described below are preferred.

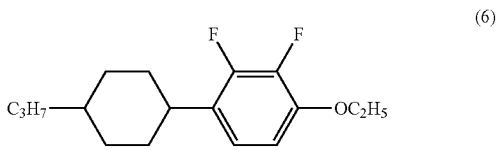
(6)

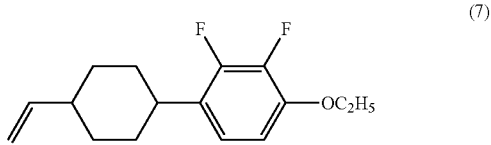
(7)

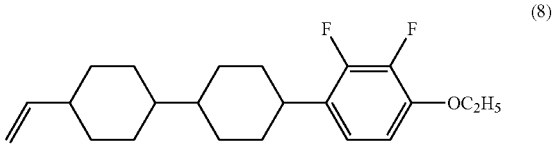
(8)

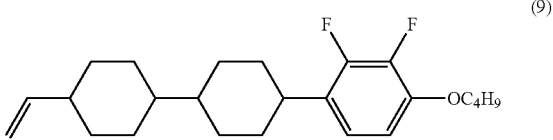
(9)

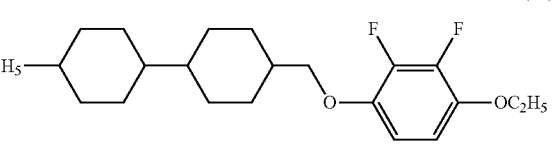
(10)

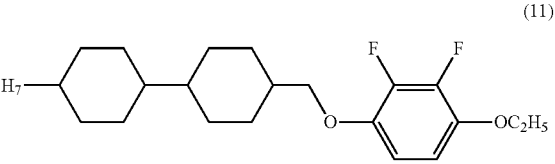
(11)

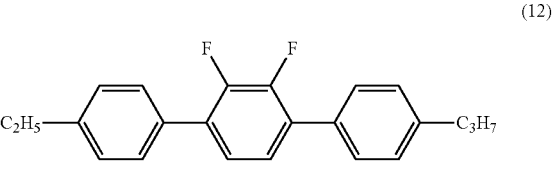
(12)

(13)

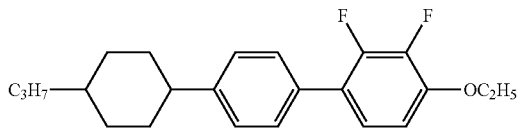

Next, general examples of the compound having the positive dielectric anisotropy include compounds as represented by chemical formulas (14) to (21) below, and dielectric anisotropy of each compound is approximately 2 or more and approximately 30 or less. Moreover, the dielectric anisotropy can be classified into a middle degree including approximately 2 to approximately 15, and a high degree exceeding approximately 15 and approximately 30 or less.

Furthermore, a compound having structure represented by formula (b) may be appropriately formed of a mixture with the compound having a high degree exceeding approximately 15 and approximately 30 or less. The mixing allows an increase in Δ∈ while suppressing a rise of refractive index anisotropy Δn, and suppression of a rise of V90.

(b)

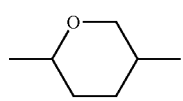

In the liquid crystal panel according to the FFS mode, when a compound is used for the liquid crystal layer formed of the mixture of the compound having the negative dielectric anisotropy (Δ∈) and the compound having the positive dielectric anisotropy to allow optically uniform self-compensation, an absolute value of Δ∈ is preferably moderately larger.

(14)

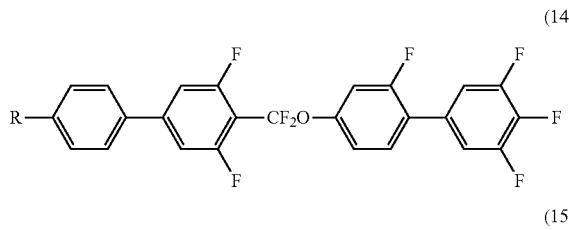

(15)

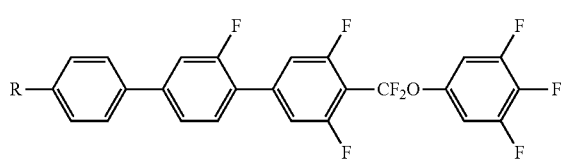

(16)

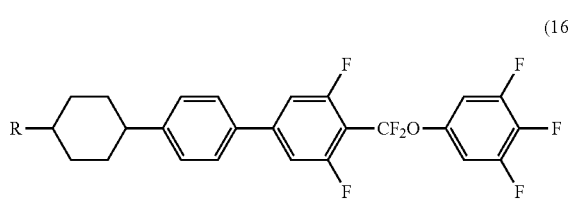

(17)

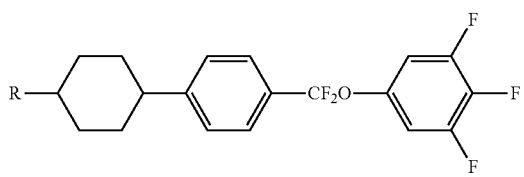

(18)

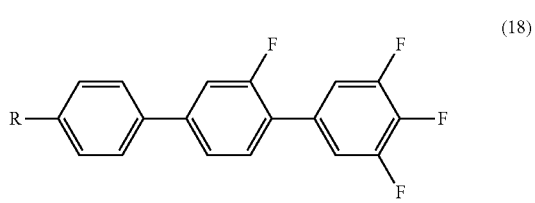

(19)

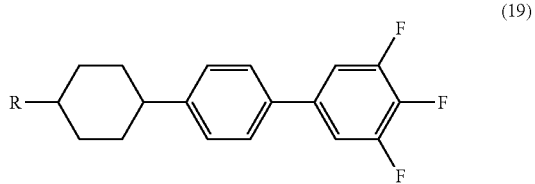

(20)

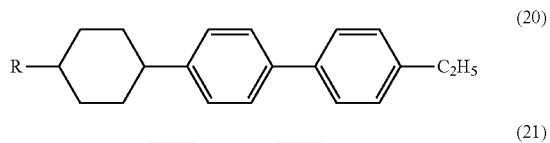

(21)

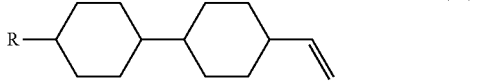

wherein, R is an alkyl group having 2 to 7 carbons or an alkenyl group having 2 to 7 carbons.

Above all, a compound having 2-tetrahydropyran-1,4-yl, 3-tetrahydropyran-1,4-yl and 3,5-dioxane-1,4-yl being a compound having structure represented by formula (b) has a middle degree of refractive index anisotropy (Δn), and also has the high degree of dielectric anisotropy (Δ∈) (exceeding approximately 15 and approximately 30 or less), and thus has excellent capability of adjusting a ratio of refractive index anisotropy (Δn) to dielectric anisotropy (Δ∈).

(b)

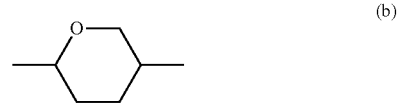

Preferred examples of such compounds include compounds as represented by (22) to (25) below.

(22)

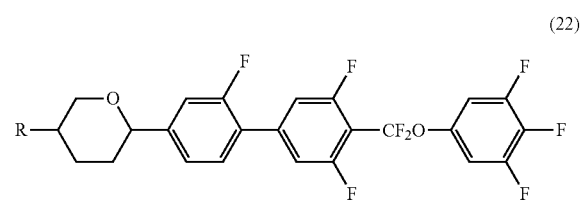

-continued

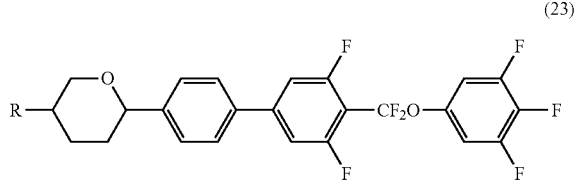
(23)

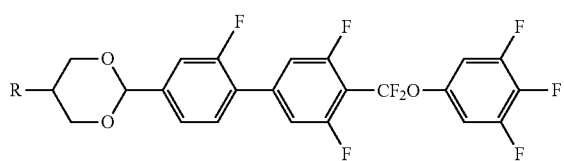
(24)

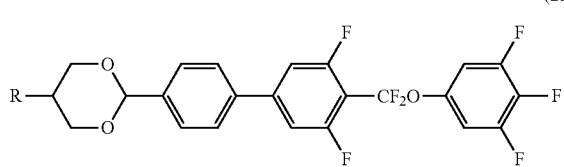
(25)

wherein, R is an alkyl group having 2 to 7 carbons or an alkenyl group having 2 to 7 carbons.

Specific examples include compound (26) to (28) below.

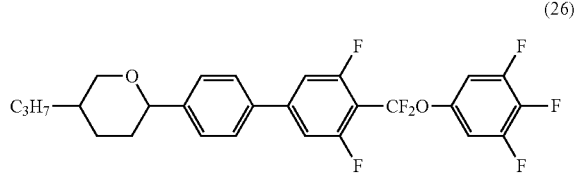
(26)

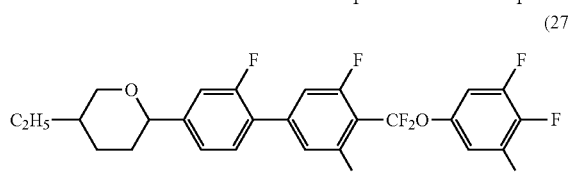
(27)

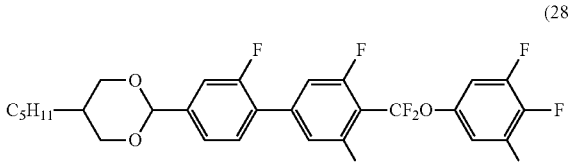
(28)

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

Color filter substrate CF was prepared by using, on a glass substrate, a black pigment dispersion resist, forming a black matrix pattern, and then repeatedly performing, in the order of red, green and black, coating of a pigment dispersion type resist according to a spin coating method, pre-baking, exposure, etching and post-baking, and further forming an ITO film having a thickness of approximately 1,500 Å by a sputtering method, and a photo spacer having a height of approximately 3.5 micrometers by a positive resist, and forming a polyimide alignment film having a thickness of approximately 1,000 Å.

Array substrate AR was prepared by laminating and forming, on TFT formed on a glass substrate, a passivation film, a flattened resin layer and also a lower electrode, an insulating film and an upper electrode by an ordinary method, and forming a polyimide alignment film having a thickness of approximately 1,000 Å.

A protruded electrode in an upper electrode can be prepared for example, by etching of ITO, but may prepared by preparing a protrusion with an organic material, and then coating ITO or metal oxide.

Liquid crystals A to D were injected between color filter substrate CF and array substrate AR, and liquid crystal cells A to D were prepared.

In liquid crystals A to D, with regard to a compound having a negative dielectric anisotropy, at least one compound can be appropriately selected from the compounds (1) to (13), and specific compounds are as presented in Table 1. With regard to a compound having a positive dielectric anisotropy, at least one compound can be appropriately selected from the compounds (14) to (25), and specifically, JC-5149XX (NI: 91.6° C., Δn: 0.105, Δ∈: 14.0) made by JNC Corporation was used.

In addition, with regard to liquid crystals B and C, compound (26) was mixed as a compound having structure represented by formula (b), and further compound (28) as any other compound were mixed for liquid crystal C, and liquid crystals B and C were prepared at ratios presented in Table 1.

(b)

Table 1 presents compounds and compositions (% was expressed in terms of weight %) of liquid crystals A to D, and characteristics of liquid crystal cells A to D. The structure represented by formula (b) was abbreviated as ring (b).

TABLE 1

| Compound | Liquid crystal A | | Liquid crystal B | | Liquid crystal C | | Liquid crystal D |
|---|---|---|---|---|---|---|---|
| Ratio of compound having negative Δ∈ | | 60% | | 30% | | 5% | 0% |
| Breakdown of compound having negative Δ∈ | Compound (6) | 10% | Compound (4) | 5% | Compound (4) | 5% | |
| | Compound (7) | 10% | Compound (12) | 10% | | | |
| | Compound (8) | 10% | Compound (13) | 15% | | | |
| | Compound (9) | 10% | | | | | |

TABLE 1-continued

| | | | | | | | | |
|---|---|---|---|---|---|---|---|---|
| | Compound (10) | 10% | | | | | | |
| | Compound (11) | 10% | | | | | | |
| Ratio of compound having positive Δε without ring (b) | JC-5194XX | 40% | JC-5194XX | 65% | JC-5194XX | 65% | JC-5194XX | 100% |
| Ratio of compound having positive Δε with ring (b) | | 0% | Compound (26) | 5% | Compound (26) | 15% | | 0% |
| Ratio of any other compound | | 0% | | 0% | Compound (28) | 15% | | 0% |

| Characteristics of liquid crystal cell | Liquid crystal cell A2 | Liquid crystal cell B | Liquid crystal cell C | Liquid crystal cell D |
|---|---|---|---|---|
| Δn | 0.101 | 0.139 | 0.116 | 0.105 |
| Δε | 2.4 | 10.0 | 20.5 | 14.0 |
| Tmax | 0.266 | 0.245 | 0.2424 | 0.234 |

Characteristics of liquid crystal cells A to D were measured according to the methods described below.

Optical anisotropy (Δn; measured at 25° C.): Measurement was carried out using an Abbe refractometer using light having a wavelength of 589 nm.

Dielectric anisotropy (Δ∈; measured at 25° C.): A sample was put in a TN device in which a distance (cell gap) between two glass substrates was 9 micrometers and a twist angle was 80 degrees. A voltage of 10 V was applied to the cell, and a dielectric constant (∈∥) in the major axis direction of liquid crystal molecules was measured. A voltage of 0.5 V was applied to the cell, and a dielectric constant (∈⊥) in the minor axis direction of the liquid crystal molecules was measured. A value of dielectric anisotropy was calculated from an equation: Δ∈=∈∥–∈⊥.

Maximum value of a light transmittance (Tmax; measured at 25° C.): A transmittance at which a transmittance-driving voltage curve becomes substantially constant after raising driving voltage from a threshold was measured as Tmax.

Next, a polarizer and a phase difference plate (Δn·d=(nx−ny)·d=50 nm), Rth=(nx−nz), d=120 nm) obtained by performing stretching treatment of a norbornene-based film were bonded through an acrylic pressure-sensitive adhesive such that an absorption axis of the polarizer and a phase lagging axis (nx direction) of the phase difference plate were orthogonally crossed with each other, and thus a composite optical film was obtained.

A phase difference value was measured using KOBRA-21ADH made by Oji Scientific Instruments.

Next, the composite optical films described above were bonded on both sides of liquid crystal cells A to D, and thus liquid crystal panels 1 to 7 were prepared.

An electrode shape of each of liquid crystal panels 1 and 3 was formed into a semicircular form, a shape of panel 5 was formed into a trapezoidal form, and a shape of each of panels 2, 4, 6 and 7 was formed into a quadrangular form (flat plate form).

In addition, color temperature in a white display in each panel was adjusted to approximately 10,000 K by a backlight.

Each liquid crystal panel was driven by an FFS mode, and driving voltage (V90) at a 90% transmittance, and a transmittance of liquid crystal panels were measured using Luminance Colorimeter BM-5A made by Topcon Corporation. The results are presented in Table 2.

TABLE 2

| Panel | Liquid crystal | Electrode shape | V90 | Transmittance |
|---|---|---|---|---|
| 1 | Liquid crystal A | Semicircular | 3.6 | 8.0% |
| 2 | Liquid crystal A | Quadrangular | 7.1 | 7.7% |
| 3 | Liquid crystal B | Semicircular | 1.8 | 7.5% |
| 4 | Liquid crystal B | Quadrangular | 3.2 | 7.3% |
| 5 | Liquid crystal C | Trapezoidal | 1.4 | 7.3% |
| 6 | Liquid crystal C | Quadrangular | 2.8 | 7.2% |
| 7 | Liquid crystal D | Quadrangular | 3.5 | 6.9% |

Table 2 presents that, when a same kind of liquid crystal is used, both V90 and the transmittance are found to be further improved for panels 1, 3 and 5 in which a cross-sectional shape of the electrode is in a curved surface of the semicircular or trapezoidal form, in comparison with a panel having a rectangular form. In particular, the compound having structure represented by ring (b) is mixed with regard to panels 3 and 5, and therefore a value of V90 is found to be significantly decreased.

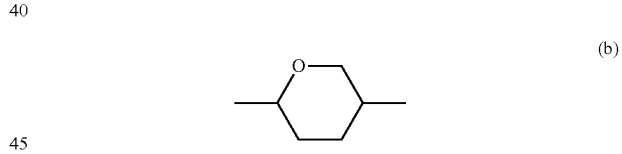

(b)

Moreover, with regard to panels 1, 3 and 5, a respect of decreased color difference during the white display is confirmed in an experiment.

As described above, according to the present embodiment, in the liquid crystal panel according to the FFS mode, formation of the cross-sectional shape of the upper electrode into a semicircular form or trapezoid form allowed driving at a low voltage, and simultaneously obtaining of a high transmittance.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

REFERENCE SIGNS LIST

10 . . . liquid crystal panel, 11 . . . first polarizer, 12 . . . second polarizer, 13 . . . backlight apparatus, 14 . . . first transparent substrate, 15 . . . scanning line, 16 . . . gate insulating film, 17 . . . semiconductor layer, 18 . . . signal line, 19 . . . passivation film, 20 . . . flattened resin layer, 21 . . . lower electrode, 22 . . . contact hole, 23 . . . inter-electrode insulating film (insulating layer), 24 . . . upper electrode (protruded electrode), 25 . . . slit-shaped opening, 26 . . . alignment film, 27 . . . second transparent substrate, 28 . . . light-shielding layer, 29 . . . color filter layer, 30 . . . overcoat layer, 31 . . . alignment film, LC . . . liquid crystal layer, AR . . . array substrate (first substrate), CF . . . color filter substrate (second substrate), S . . . source electrode, G . . . gate electrode, D . . . drain electrode.

What is claimed is:

1. A liquid crystal panel having a first substrate and a second substrate that are oppositely arranged, and a liquid crystal layer interposed between the first substrate and the second substrate, wherein
    the first substrate has a plurality of signal lines and scanning lines formed in a matrix, an upper electrode having a plurality of slit-shaped openings and cross-sectional curve-shaped protruded electrodes alternately formed for every sub-pixel divided by the scanning lines and the signal lines, and a lower electrode formed with the upper electrode through an insulating layer, wherein the protruded electrode has a semicircular shape, an elliptic shape or a trapezoidal shape, and
    the second substrate has a light-shielding layer superimposed with the signal lines and the scanning lines in a planar view, and a color filter layer formed for every sub-pixel described above.

2. The liquid crystal panel according to claim 1, wherein the upper electrode and the lower electrode overlap with each other in a planar view.

3. The liquid crystal panel according to claim 1, wherein the protruded electrode is formed of an organic substance.

4. The liquid crystal panel according to claim 1, wherein the liquid crystal layer is formed of a mixture of at least one compound having a negative dielectric anisotropy and at least one compound having a positive dielectric anisotropy.

5. The liquid crystal panel according to claim 4, wherein the compound having the negative dielectric anisotropy has a structure represented by formula (a), and a dielectric anisotropy in a range of −10 or more and −2 or less, and the compound having the positive dielectric anisotropy has a dielectric anisotropy in a range of 2 or more and 30 or less:

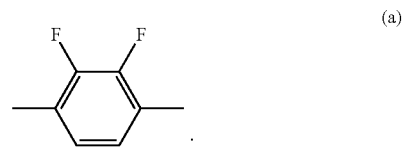

(a)

6. The liquid crystal panel according to claim 4, wherein the compound having the positive dielectric anisotropy is further formed of a mixture with a compound having structure represented by formula (b):

(b)

7. The liquid crystal panel according to claim 5, wherein the compound having the positive dielectric anisotropy is further formed of a mixture with a compound having structure represented by formula (b):

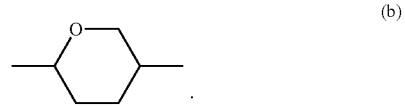

(b)

* * * * *